United States Patent
Nomine et al.

(10) Patent No.: US 12,300,131 B2
(45) Date of Patent: May 13, 2025

(54) METHOD FOR MANAGING A HEAD-MOUNTED DISPLAY, ASSOCIATED COMPUTER PROGRAM PRODUCT AND ASSOCIATED HEAD-MOUNTED DISPLAY

(71) Applicant: THALES, Meudon (FR)

(72) Inventors: Louis Nomine, Mérignac (FR); Eric Gaulue, Mérignac (FR); Jean-Michel Francois, Mérignac (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 18/528,682

(22) Filed: Dec. 4, 2023

(65) Prior Publication Data
US 2024/0203304 A1    Jun. 20, 2024

(30) Foreign Application Priority Data
Dec. 20, 2022 (FR) ...................................... 2213937

(51) Int. Cl.
| | |
|---|---|
| *G09G 3/00* | (2006.01) |
| *B64D 43/00* | (2006.01) |
| *G06F 3/01* | (2006.01) |

(52) U.S. Cl.
CPC ............ *G09G 3/001* (2013.01); *B64D 43/00* (2013.01); *G06F 3/012* (2013.01); *G09G 2320/0626* (2013.01); *G09G 2340/14* (2013.01); *G09G 2354/00* (2013.01); *G09G 2380/12* (2013.01)

(58) Field of Classification Search
CPC .. B64D 43/00; G02B 27/017; G02B 27/0101; G02B 2027/0118; G02B 2027/0187; G02B 2027/014; G06F 3/012; G09G 3/001; G09G 2320/0626; G09G 2354/00; G09G 2340/14; G09G 2380/12
See application file for complete search history.

(56) References Cited

U.S. PATENT DOCUMENTS

| | | |
|---|---|---|
| 10,914,955 B2 | 2/2021 | Lafon et al. |
| 2002/0126066 A1 | 9/2002 | Yasukawa et al. |
| 2014/0364197 A1* | 12/2014 | Osman .................. A63F 13/493 463/24 |
| 2016/0272340 A1* | 9/2016 | Leland ............... G02B 27/0103 |

(Continued)

FOREIGN PATENT DOCUMENTS

| | | |
|---|---|---|
| EP | 2 942 657 A1 | 11/2015 |
| EP | 3 921 690 A1 | 12/2021 |

(Continued)

*Primary Examiner* — Doon Y Chow
(74) *Attorney, Agent, or Firm* — BakerHostetler

(57) ABSTRACT

A method for managing a head-mounted display having a predetermined field of view and a predetermined axis of sight and configured to display a plurality of graphic messages, the method comprising the following steps implemented when the head-mounted display is being worn by a user in a predetermined environment comprising a plurality of information interfaces:

A1. determining a first datum (D1) relating to a position and orientation of a head of the user with respect to the environment based on information relating to a spatial arrangement of the environment;

B. modifying a brightness of the head-mounted display and/or adjusting the graphic messages, depending on a dataset containing the first datum and containing information relating to the interfaces.

12 Claims, 3 Drawing Sheets

(56) References Cited

U.S. PATENT DOCUMENTS

| | | | |
|---|---|---|---|
| 2017/0115839 A1* | 4/2017 | Park | G09G 5/12 |
| 2017/0160546 A1* | 6/2017 | Bull | G02B 27/017 |
| 2019/0138088 A1* | 5/2019 | Evans | H04N 13/344 |
| 2019/0235247 A1* | 8/2019 | Norden | G06F 3/013 |
| 2019/0346678 A1 | 11/2019 | Nocham | |
| 2020/0211499 A1* | 7/2020 | Sun | G06F 3/147 |
| 2023/0071993 A1* | 3/2023 | Sztuk | G06V 40/171 |
| 2023/0375840 A1* | 11/2023 | Takemoto | G02B 27/0179 |
| 2024/0112608 A1* | 4/2024 | Matsumoto | G06F 3/147 |

FOREIGN PATENT DOCUMENTS

| | | |
|---|---|---|
| EP | 3 921 692 A1 | 12/2021 |
| FR | 3 098 932 A1 | 1/2021 |
| WO | 2016/071352 A1 | 5/2016 |
| WO | 2020/160826 A1 | 8/2020 |
| WO | 2020/160827 A1 | 8/2020 |

\* cited by examiner

METHOD FOR MANAGING A HEAD-MOUNTED DISPLAY, ASSOCIATED COMPUTER PROGRAM PRODUCT AND ASSOCIATED HEAD-MOUNTED DISPLAY

CROSS-REFERENCE TO RELATED APPLICATION

This application claims priority to foreign French patent application No. FR 2213937, filed on Dec. 20, 2022, the disclosure of which is incorporated by reference in its entirety.

FIELD OF THE INVENTION

The present invention relates to the field of head-worn displays (HWDs) or head-mounted displays (HMDs), and to management of the content displayed thereby, and more particularly to the field of head-mounted displays intended to be worn in a cockpit of a vehicle.

BACKGROUND

As known per se, head-mounted displays allow virtual objects to be displayed on a display surface that is "worn" by the user, i.e. integrated into a helmet, glasses or any other device mechanically linking the movement of the display surface to the movement of the user.

These devices allow these virtual objects to be displayed in what is referred to as an "aligned" position, i.e. their images are perfectly superposed on the locations occupied by real outside objects. Thus, the displayed image of a synthetic runway is perfectly superposed with the exact location that the actual runway occupies on the outside terrain. The same goes, for example, for the horizon line.

Thus, for example, when the head-mounted display is used in a carrier such as an aircraft, it is possible to associate a projection reference frame of the external environment of the aircraft and another projection reference frame, for example of the display surface or indeed of the head of the user.

In the case of a head-mounted display, displaying information in various reference frames for example allows information to be displayed using symbols the portrayal of which is related to a specific reference frame (e.g. portrayal in the head-mounted display of a drawn synthetic line representing the horizon line belonging to the local terrestrial reference frame).

In the case of an aircraft, it may be problematic for a member of aircrew using a head-mounted display to have content displayed by the head-mounted display superposed on the various elements of a cockpit: head-up display (HUD), cockpit screens, electronic flight bag (EFB), etc.

Furthermore, depending on the type of mission, head-mounted displays are likely to display a very high number of graphic messages: speed, angle of incidence, horizon line, altitude, heading, a distance or a path to an objective, warning messages, etc.

In the remainder of the present document, the expression "graphic message" will be understood to mean any information displayed by the head-mounted display and relating to the environment (for example the aircraft) in which the display is being worn. This information may take the form of a symbol, a graphic, text, a numerical parameter, etc.

The constant presence of these graphic messages is likely to unnecessarily clutter the field of view of the user and to increase her or his mental workload. This cluttering may thus cause the pilot stress or increase her or his fatigue. It may also cause her or him to miss important information delivered by an element of the cockpit.

At the present time, if the user wishes to avoid such superposition or cluttering, she or he must manually adjust the brightness or the displayed level of information (called decluttering). These solutions result in the user losing focus when looking for the control allowing brightness adjustment or decluttering. Furthermore, such manual adjustments are pre-configured and in general offer few different modes, two modes for example: a "maximum information level" mode in which all available graphic messages are displayed, and a "reduced information level" mode in which about half of the available graphic messages are displayed (typically only the most critical ones). This solution therefore suffers from a detrimental lack of flexibility.

Alternatively, the user may remove the head-mounted display. However, this solution creates problems with storage of the head-mounted display when it is not being worn, wastes time and runs the risk of misinterpretation of certain data.

SUMMARY OF THE INVENTION

The invention aims to mitigate certain of the problems of the prior art. To this end, one subject of the invention is a method for managing a head-mounted display, comprising a first step of detecting the position and orientation of the head wearing the display with respect to the environment in which the display is being worn. The method comprises a second step of modifying the brightness of the display and/or adjusting the graphic messages displayed by the display, depending on a dataset containing the first datum and containing information relating to information interfaces of the environment. Thus, the method of the invention allows the problem of cluttering to be addressed automatically, without the drawbacks of the aforementioned solutions.

To this end, one subject of the invention is a method for managing a head-mounted display having a predetermined field of view and a predetermined axis of sight and configured to display a plurality of graphic messages, said method comprising the following steps implemented when said head-mounted display is being worn by a user in a predetermined environment comprising a plurality of information interfaces:
  A1. determining a first datum relating to a position and orientation of a head of said user with respect to said environment based on information relating to a spatial arrangement of said environment;
  B. modifying a brightness of said head-mounted display and/or adjusting said graphic messages, depending on a dataset containing the first datum and containing information relating to said interfaces.

According to one embodiment, the adjustment of the graphic messages comprises adjusting the content and/or number and/or position of the graphic messages and the first datum comprises an indication regarding a coincidence of the field of view with said interfaces and regarding a superposition of the axis of sight with said interfaces. Preferably, the adjustment of the number of graphic messages comprises deleting at least one of the graphic messages, which is referred to as the redundant message, when said indication and said information relating to said interfaces indicate that the field of view of the head-mounted display is coincident with one of said interfaces delivering said redundant message or equivalent information.

According to one embodiment, the method of the invention comprises, subsequent to step B, a step C in which the user modifies a position of the axis of sight in the field of view in such a way as to modify said indication regarding a superposition of the axis of sight with said interfaces when steps A1 and B are subsequently implemented.

According to one embodiment, the adjustment of the graphic messages is made only when the first datum comprises the indication that the axis of sight is superposed with one of said interfaces, while being more than 0.6° to 6° from an edge of said interface, or when the first datum comprises the indication that the field of view coincides by more than 0.6° to 6°.

According to one embodiment, the method of the invention comprises a step A2 implemented before step B consisting in receiving data relating to operation of the interfaces, which are referred to as the second data, the second data being contained in said dataset used in step B. Preferably, the adjustment of the number of graphic messages comprises displaying only at least one of said graphic messages rated beforehand as being critical, when the first datum indicates that the axis of sight is superposed on one of said interfaces rated beforehand as having priority in said information relating to said interfaces and when the second datum indicates that said interface rated beforehand as having priority is turned on.

According to one embodiment, the method of the invention comprises a step A3 implemented before step B consisting in receiving at least one physiological datum of the user, which is referred to as the third datum, the third datum being contained in said dataset used in step B.

According to one embodiment, said environment is a cockpit of a vehicle.

Preferably, in this embodiment, the method of the invention comprises a step A4 implemented before step B consisting in receiving at least one datum relating to a phase of use of the vehicle, which is referred to as the fourth datum, the fourth datum being contained in said dataset used in step B.

Preferably, in this embodiment, the method of the invention comprises a step A5 implemented before step B consisting in receiving at least one datum relating to an external environment of the vehicle, which is referred to as the fifth datum, the fifth datum being contained in said dataset used in step B.

Preferably, in this embodiment of the method of the invention, the adjustment of the number of graphic messages consists in displaying a maximum number of graphic messages when the first datum indicates that said field of view is entirely superposed with a region of the cockpit displaying none of said graphic messages or equivalent information, a windscreen for example.

According to one embodiment, the steps of the method of the invention are repeated with a period of less than or equal to 100 ms, and preferably of less than 10 ms.

Another subject of the invention is a computer program product comprising code instructions allowing the steps of the method according to the invention to be performed when said program is executed on a computer.

Another subject of the invention is a head-mounted display intended to be worn by a user, said head-mounted display having a predetermined field of view and a predetermined axis of sight and being configured to display a plurality of graphic messages, said head-mounted display comprising a processor configured to implement the steps of the method according to the invention when said head-mounted display is being worn in a predetermined environment comprising a plurality of information interfaces.

BRIEF DESCRIPTION OF THE DRAWINGS

Other features, details and advantages of the invention will become apparent on reading the description given with reference to the appended drawings, which are given by way of example and which show, respectively.

In the figures, unless otherwise indicated, the elements shown have not been drawn to scale and identical references designate identical elements.

DETAILED DESCRIPTION

Figure 1:
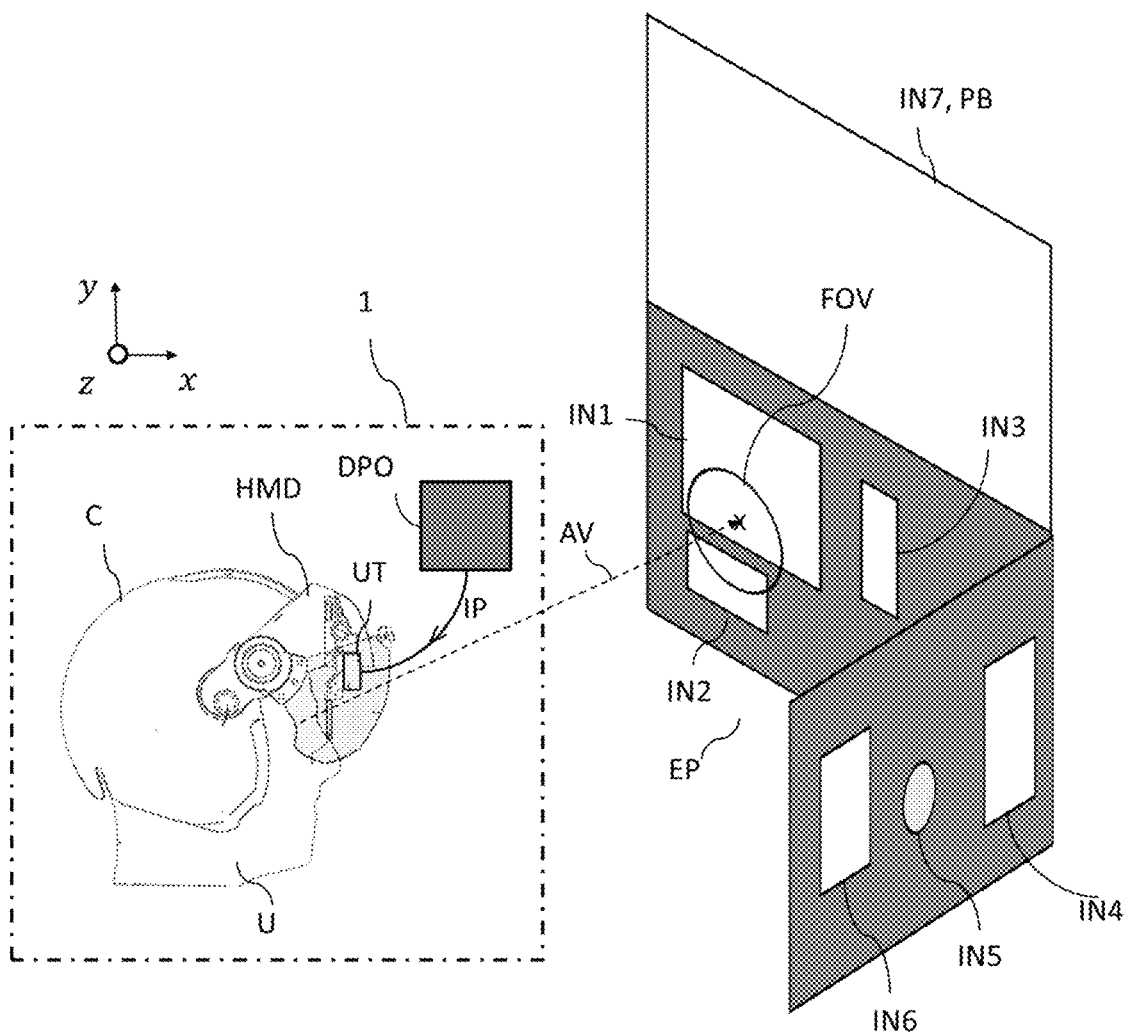
FIG. 1, a schematic view of a system according to the invention comprising a head-mounted display according to the invention and a posture-detecting device, FIG. 2, a schematic illustration of the method of the invention, FIG. 3, an embodiment in which the predetermined environment is a cockpit of an airliner, FIG. 4, a schematic illustration of an embodiment of the method of the invention.

FIG. 1 schematically illustrates a system 1 according to the invention comprising a head-mounted display HMD according to the invention and a posture-detecting device DPO.

The head-mounted display HMD of the invention is intended to be worn, and is for example integrated into a helmet, glasses or any other device mechanically linking the movement of the display surface to the movement of the user U. It has a predetermined field of view FOV and a predetermined axis of sight AV and is configured to display a plurality of graphic messages. Such a head-mounted display HMD is known to those skilled in the art and a detailed description of such a device would be beyond the scope of the invention. For a description of such devices, the reader may in particular refer to patent applications FR1901166, FR1901163 and EP15166318 or even WO2016071352A1.

Figure 2:
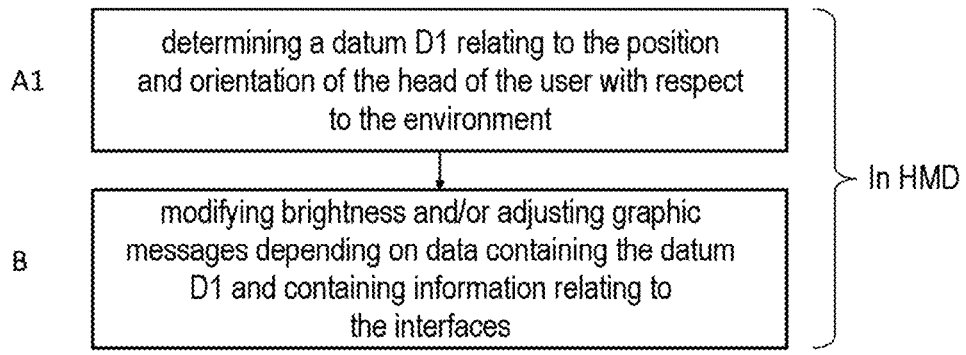

The head-mounted display HMD comprises a processor UT configured to implement the steps of the method of the invention, which are schematically illustrated in FIG. 2, when the head-mounted display HMD is being worn in a predetermined environment EP comprising a plurality of information interfaces IN1-IN6.

By "information interfaces" what is meant here is any element observable by the user U delivering information relating directly or indirectly to the environment EP. For example, according to one embodiment, the environment EP is an aircraft cockpit and the information interfaces comprise HUD devices, the electronic flight bag, flight instruments for piloting and navigating, controlling the engines, carrying out telecommunications, monitoring fuel consumption, etc., and more generally any element of the cockpit.

By way of non-limiting example, in the embodiment of FIG. 1, the environment comprises six information interfaces IN1-IN6 and a windscreen PB allowing the outside landscape to be viewed. In another embodiment, there is a different number of information interfaces and windscreens. The windscreen may be likened to a seventh interface IN7 displaying visual information on the external environment (landscape).

According to a first embodiment, the environment EP in which the head-mounted display HMD is worn is a physical environment. The interfaces IN1-IN7 are therefore physical objects.

Alternatively, according to a second embodiment, the environment EP is a virtual environment, for example one generated by the processor UT. In the second embodiment, the interfaces IN1-IN7 are therefore generated virtual objects and not physical objects as in the first embodiment. However, this in no way alters the method of the invention.

The processor UT comprises information relating to a spatial arrangement of the environment EP, which is referred to as the spatial information IS. This spatial information IS for example comprises the position of the information interfaces IN1-IN7 in a reference frame xyz and their dimensions. This spatial information is preferably stored in the processor UT prior to the implementation of the method of the invention.

The device DPO is configured to detect a position and an orientation of a head of the user U of the head-mounted display HMD and to transmit this datum IP to the processor UT. The datum IP therefore comprises the position of the head in the reference frame xyz and its orientation, which is obtained by measuring elevation and azimuth in this reference frame. Preferably, the datum IP is transmitted by a cable in order to make the system 1 more robust.

Such a device DPO is known to those skilled in the art and a detailed description of this device would be beyond the scope of the invention.

According to a first variant, this measurement of position and orientation is carried out using an optical method, the device DPO comprising, for example, cameras placed in the environment EP with a view to determining the datum IP via image-processing methods.

Alternatively, according to a second variant, the device DPO comprises one or more inertial sensors for determining the datum IP. According to one embodiment, the device DPO is "hybrid" and the datum IP is determined via a combination of an optical method and a method employing one or more inertial sensors.

According to a third variant, the device DPO comprises an element for generating an electromagnetic field with a predetermined spatial distribution in the environment EP and comprises receivers for detecting an electromagnetic field. The datum IP is generated by measuring the strength of the field detected by the receivers, given the predetermined spatial distribution of the electromagnetic field.

In the embodiment illustrated in FIG. 1, the device DPO is not comprised in the head-mounted display HMD but is an element physically dissociated from the latter. Alternatively, according to another embodiment, the device DPO is comprised in the head-mounted display HMD. In this embodiment, the processor UT may itself be configured to generate the datum IP. The choice regarding whether or not to dissociate the device DPO from the head-mounted display HMD essentially depends on the implemented posture-detection technique. Preferably, the device DPO is configured so that the position of the head is determined with an accuracy of better than or equal to 5 mm and so that the orientation of the head is determined with an accuracy of better than 5 mrad, in order to allow accurate display adjustment depending on the posture of the user.

In a first step A1 of the method of the invention, the processor UT of the display HMD is configured to determine a first datum D1 relating to the position and orientation of the head of the user U with respect to the environment EP. This datum D1 is determined from the datum IP transmitted by the device DPO and from the spatial information IS.

After step A1, the method of the invention comprises a step B implemented by the processor UT consisting in modifying the brightness of the head-mounted display HMD and/or adjusting the graphic messages, depending on a dataset containing the first datum D1 and containing information relating to the interfaces, which is denoted II.

Like the spatial information IS, the information relating to the interfaces II is preferably stored in the processor UT before the method of the invention is implemented.

By way of non-limiting example, the information II relating to the interfaces comprises, for each interface:
the content presented by the interface (i.e. the type of information presented, for example altitude when the interface in question is an altimeter);
optionally, the colour and brightness of the content;
optionally, the priority of the interface.

By "priority", what is meant here is that the interface in question displays mission-critical information that necessarily take priority over the information displayed by the head-mounted display HMD. According to one embodiment, this priority is indicated in the form of a numerical value, for example 0 for non-priority or 1 for priority. It will be understood that the numerical scale may comprise more than two values to quantify more than two priority levels in certain embodiments.

It will be understood that the method of the invention is dynamic, i.e. that steps A1 and B are repeated over time in order to take into account any change in the posture of the user. In order to obtain a display that is sufficiently responsive to a change in posture, the steps of the method of the invention are repeated with a period of less than or equal to 100 ms, and preferably less than or equal to 10 ms.

Step B allows the brightness of the head-mounted display HMD and/or the graphic messages to be adjusted directly in the head-mounted display HMD in order to deal with the problem of cluttering automatically. It will be understood that the invention covers many possible implementations of step B without departing from the scope of the invention. The remainder of the description details preferred implementations of step B that in no way constitute an exhaustive list of all the implementations covered by the invention.

Generally, in step B, the adjustment of the graphic messages comprises adjustment of the content and/or number and/or position of the graphic messages displayed in the field of view FOV by the head-mounted display HMD. By "content of a graphic message", what is meant here is the colour of the graphic message, the brightness of the graphic message, the colour, type of line (solid line, double line, dotted/dashed/dash-dotted line, etc.) and thickness of the border of the graphic message, etc.

According to one preferred embodiment, denoted MP1, the datum D1 is determined by means of the following sub-steps:
i. receiving the datum IP relating to the position and orientation of the head;
ii. determining, from the datum IP and data IS, a coincidence of the field of view FOV with the interfaces. The first datum D1 then comprises an indication regarding these coincidences, for example taking the form of a numerical value such as 0 to indicate non-coincidence and 1 to indicate coincidence.

By "coincidence of the field of view FOV with the interfaces" what is meant here is an overlap, even partial overlap, of the field of view FOV with the interfaces. This coincidence is directly deducible from the datum IP (posture measurement) and data IS (spatial information on the environment EP).

By way of non-limiting example, in FIG. 1, the datum D1 takes the following form: D1=($C_1$=1; $C_2$=1; $C_3$=0; $C_3$=0; $C_4$=0; $C_5$=0; $C_6$=0; $C_7$=0) corresponding to the indication that the field of view FOV coincides with the interfaces IN1 and IN2 but does not coincide with the interfaces IN3 to IN7.

Preferably, in one embodiment MP2, sub-step ii) comprises determining a superposition of the axis of sight AV with the interfaces. The first datum D1 then comprises an indication regarding coincidences and superpositions, for example taking the form of a numerical value such as 0 to indicate non-coincidence or non-superposition and 1 to indicate coincidence or superposition.

By way of non-limiting example, in FIG. 1, the datum D1 takes the following form: $D1=[(C_1=1; C_2=1; C_3=0; C_3=0; C_4=0; C_5=0; C_6=0; C_7=0); S_1]$ corresponding to the indication that the field of view FOV coincides with the interfaces IN1 and IN2 but does not coincide with the interfaces IN3 to IN7 and the indication $S_1$ that the axis of sight AV is superposed with the interface IN1.

Simultaneous management of coincidence and superposition allows "sub-levels" of display of graphic messages to be defined in step B:
 a first display sub-level referred to as "intermediate" corresponding to a coincidence of the field of view FOV with an interface but without superposition of the axis of sight AV with said interface. In this case, a number N≥1 of graphic messages are deleted depending on the information displayed by said interface.
 a second display sub-level referred to as "reduced" corresponding to a coincidence of the field of view FOV and superposition of the axis of sight AV with the interface. In this case, a number M>N of graphic messages are deleted depending on the information displayed by said interface.

Preferably, step B consists in displaying only graphic messages containing information different from the information displayed by the one or more information interfaces for which there exists a coincidence of the field of view FOV or of the axis of sight AV. In other words, in this embodiment, step B consists in deleting at least one of the graphic messages—referred to as the redundant message—when the datum D1 and the information II indicate that the field of view FOV coincides with an interface displaying the redundant message or equivalent information. By "equivalent information", what is meant is information that is equivalent from the point of view of the user—for example a speed in Mach or km/h.

In one embodiment, the information II indicates that an interface displays a plurality of types of information (it is an HUD for example). Thus, when the datum D1 indicates that the axis of sight AV is superposed and that the field of view FOV coincides with this interface, step B deletes a higher number of redundant messages than when the datum D1 indicates that the field of view FOV coincides with the interface but that the axis of sight AV is not superposed with this interface: the "reduced" display sub-level is therefore displayed.

According to one embodiment, when the first datum D1 indicates a coincidence of the field of view FOV with an interface $IN_i$, step B consists in moving the position of a graphic message or of a plurality of graphic messages out of the region of the field of view FOV where the field of view coincides with the interface $IN_i$. This makes it possible to avoid superposition of said graphic message with the interface $IN_i$. Preferably, this step is implemented only if it is possible to move said one or more graphic messages without creating overlap with other graphic messages displayed in the head-mounted display HMD.

This moving step may be combined with all the implementations of step B that are mentioned/described in the present description. In particular, this moving step may be combined with the step of displaying only graphic messages containing information different from the information presented by the interface $IN_i$. The moving step then moves only graphic messages containing information different from the information presented by the interface $IN_i$.

According to one embodiment, the content adjustment in step B comprises modifying the colour of the graphic message and/or the colour of the border of the graphic message when the first datum D1 indicates a coincidence of the field of view with an interface that is substantially the same colour as the graphic message. This content-adjusting step may be combined with all of the implementations of step B that are mentioned/described in the present description.

In order to improve the visual comfort of the user, it is preferable for the graphic messages not to flicker on and off as the user makes minute movements of her or his head causing the field of view or the axis of sight, when it is located on the edge of an interface, to make very fast and unintentional back-and-forth motions from one side of the edge to the other. To avoid such flickering, it is preferable to establish a "buffer" zone of 0.6° to 6° on each side of the edges of each interface, in which zone graphic-message adjustment does not take place. The adjustment of the graphic messages then takes place only when the first datum D1 comprises the indication that the axis of sight AV is superposed with an interface $IN_i$, while being more than 0.6° to 6° from an edge of this interface $IN_i$, or when the first datum D1 comprises the indication that the field of view coincides by more than 0.6° to 6° with this interface $IN_i$.

Similarly, when the axis of sight has crossed the buffer zone to the inner side of the inner edge of the interface $IN_i$ and when the adjustment of the graphic messages with respect to the interface $IN_i$ has been made, the buffer zone on the outer side of the edge of the interface $IN_i$ comes into effect. The adjustment of the graphic messages then takes place only when the first datum D1 comprises the indication that the axis of sight AV is no longer superposed with the interface $IN_i$, while being more than 0.6° to 6° from an edge of this interface $IN_i$, or when the first datum D1 comprises the indication that the field of view no longer coincides with the interface IN; by more than 0.6° to 6°.

According to one embodiment, the head-mounted display HMD comprises a control for adjusting the axis of sight AV, for example a joystick or a D-pad. The method of the invention according to the mode MP2 then comprises a step C subsequent to step B, in which the user modifies a position of the axis of sight AV in the field of view FOV. Thus, when steps A1 and B are subsequently implemented, the indication regarding the superposition between the axis of sight and the interfaces is modified. This step C makes it possible to increase the comfort of the user, preventing her or him from having to tilt her or his head too much, for example to obtain a modification of graphic messages associated with a superposition of the axis of sight AV with an interface having a high angle of elevation or of azimuth, for a given cephalic position.

Figure 3:
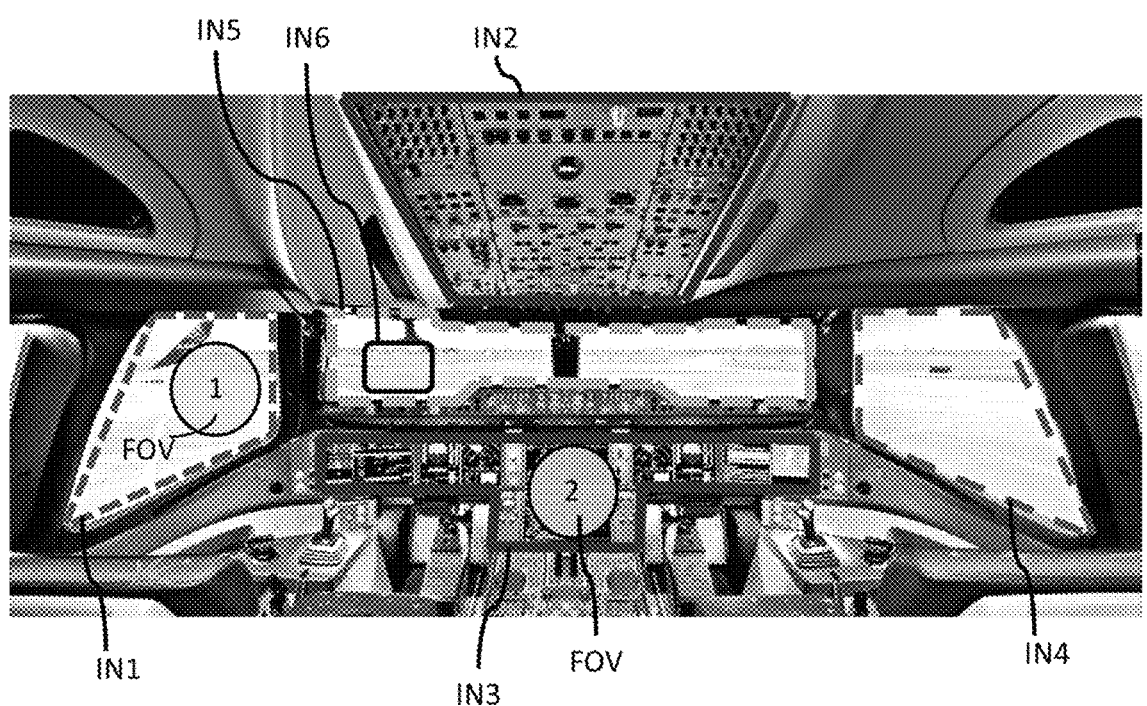

FIG. 3 illustrates an embodiment in which the predetermined environment is a cockpit of an airliner. By way of non-limiting example, the spatial information IS defines six interfaces IN1-IN6. The interfaces IN1, IN4 and IN6 are windscreens, the interface IN2 corresponds to an overhead panel (i.e. to a panel placed above the pilot's head), the interface IN3 corresponds to the flight instruments, and the interface IN6 is comprised in the interface IN5 and corresponds to a central HUD that displays piloting information for example.

In FIG. 3, by way of non-limiting example, two positions 1, 2 of the field of view FOV of the head-mounted display HMD have been shown.

In position 1, the field of view FOV coincides in its entirety with the interface IN1, which is a windscreen displaying no information. In this case, step B comprises adjusting the number of graphic messages to display a maximum number of graphic messages.

In position 2, the field of view FOV coincides in its entirety with the interface IN3, which displays information relating to piloting and navigation. In this case, step B comprises adjusting the number of graphic messages by deleting graphic messages containing piloting and navigation information.

According to one embodiment of FIG. 3, denoted M1, the interface IN6 is considered as having priority by the information II. In other words, the piloting information displayed by the HUD is considered as having priority over the graphic piloting messages displayed by the head-mounted display HMD. Step B then consists in deleting graphic messages containing navigational information when there is a coincidence of the field of view FOV or a superposition of the axis of sight AV with the central HUD interface. Alternatively, if this interface is considered as not having priority, step B does not delete the graphic messages containing information identical or similar to this interface.

According to another embodiment, the interface IN6 is still considered as having priority but a degree of priority higher than the degree of embodiment M1. In this case, it is desired for the only graphic messages superposed on the interface IN6 to be graphic messages that are considered critical (warning messages for example). Step B then consists in displaying only at least one of the graphic messages rated beforehand as being critical, when the first datum indicates that the axis of sight AV is superposed on the interface. This step may be generalized to any interface and may be combined with all of the implementations of step B that are mentioned/described in the present description.

Figure 4:
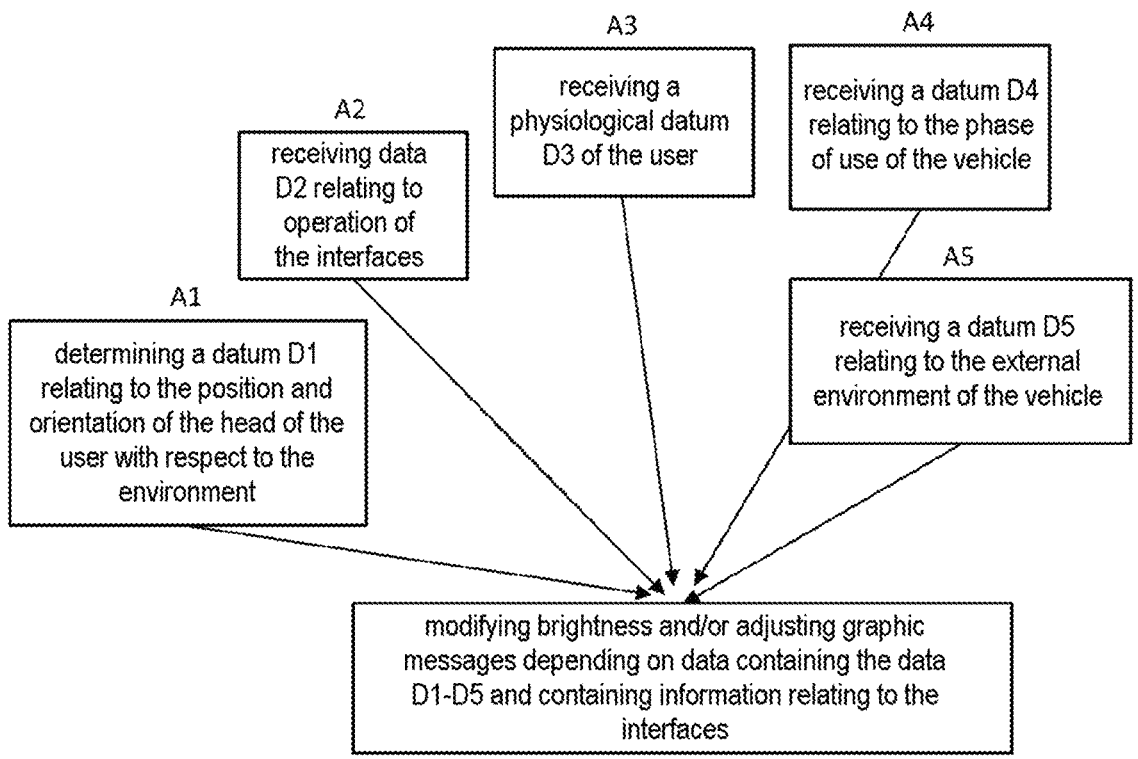

FIG. 4 illustrates one embodiment of the method of the invention comprising additional steps A2, A3, A4 and A5 that are implemented by the processor UT before step B and that generate data D2, D3, D4 and D5, respectively. In this embodiment, step B consists in modifying the brightness of the head-mounted display HMD and/or adjusting the graphic messages, depending on a dataset containing the data D1 to D5 and containing the information II.

By way of non-limiting example, in the embodiment of FIG. 4, the environment is a cockpit of a vehicle, for example an aircraft, a ship, a land vehicle, etc.

Step A2 consists in receiving data relating to operation of the interfaces, which are referred to as the second data D2. For example, these data D2 characterize whether an interface is turned on or off, or whether an interface is faulty. In this embodiment, step B does not modify the brightness and/or graphic messages when there is a coincidence of the field of view FOV or a superposition of the axis of sight AV with an interface identified as faulty or "off" in step A2.

This step A2 makes it possible to avoid deletion of information from the display that would be detrimental to the user.

Step A3 consists in receiving at least one physiological datum from the user, which is referred to as the third datum D3. By "physiological datum", what is meant is a datum relating to the cognitive workload, the stress or the fatigue of the user.

This step A3 allows, in step B, the display to be configured depending on the physical and mental condition of the user, with a view to decreasing a danger (for example falling asleep), preventing user errors or maximizing the user's attention.

In one embodiment, the physiological data comprise one or more parameters among heart rate, heart-rate variability, respiratory rate, eye movements, gaze fixation, pupillary dilation, cortisol level, skin temperature, skin conductivity, one or more markers of the activity of the parasympathetic system, an electrocardiography signal, an electroencephalography signal, a magnetoencephalography signal, an fNIR signal or an fMRI signal.

In one embodiment, the level of cognitive workload is determined based on one or more physiological parameters of the user (and/or the dynamics of these parameters), these parameters being measured physically and/or estimated logically, directly or indirectly. Determination of the physiological state of the user may comprise direct and/or indirect measurements. Direct measurements may in particular comprise one or more direct measurements of the user's heart rate and/or ECG (electrocardiogram) and/or EEG (electroencephalogram) and/or perspiration and/or breathing rate. Indirect measurements may in particular comprise estimates of the user's level of excitation or fatigue or stress, which states may in particular be correlated with flight phases or other parameters.

In one embodiment, the level of cognitive workload, stress and fatigue are characterized in step A3 by aggregating physiological data measured physically and directly on the user. These physiological values may be weighted, so as to define a score between predefined limits (for example between 0 and 100) that is potentially customizable by the user.

According to one embodiment, in step B, the number of graphic messages is decreased and/or the brightness of the head-mounted display HMD is decreased when the data D3 are representative of a high stress level or a high cognitive workload: for example, a score higher than 75 on a scale from 0 to 100.

Conversely, in step B, the number of graphic messages is increased and/or the brightness of the head-mounted display HMD is increased when the data D3 are representative of a high level of fatigue (for example a score higher than 75 on a scale from 0 to 100).

Step A4 consists in receiving at least one datum relating to a phase of use of the vehicle, which is referred to as the fourth datum D4.

This phase of use is for example the current phase of the mission being performed by the user of the vehicle.

In the embodiment where the environment is an aircraft cockpit, the phases of use are for example taxiing, take-off, landing, cruising, maneuvering (e.g.: air refuelling), etc.

This step A4 allows the display to be optimized in step B depending on the progress of the mission and/or the phase of the journey of the vehicle. For example, in the taxiing phase, step B allows information typically associated with flight, such as an artificial horizon, altitude, etc., to be deleted.

Step A5 consists in receiving at least one datum relating to an external environment of the vehicle, which is referred to as the fifth data D5. These data D5 are, for example, data relating to visibility conditions; turbulence; air, sea or land traffic; whether the journey is being made during the day or at night; etc.

This step A5 allows the display to be optimized in step B depending on the data D5. For example, in step B, the brightness of the head-mounted display HMD is increased when the data D5 are representative of a high brightness (low cloud cover and/or daytime conditions). Conversely, in step B, the brightness of the head-mounted display HMD is decreased when the data D5 are representative of a low brightness (high cloud cover and/or night-time conditions). Alternatively, in step B, a synthetic display of the runway is generated in case of degraded visibility (fog, snow, etc.).

It will be understood that each of these steps A2-A5 is optional. For example, according to one embodiment, the method of the invention consists in implementing only steps A1, A2, A3 and B.

The method of the invention lends itself particularly well to implementation on a computer. Thus, another subject of the invention is a computer program product comprising code instructions allowing the steps of the method of the invention to be performed when the program is executed on a computer.

The invention claimed is:

1. A method for managing a head-mounted display having a predetermined field of view and a predetermined axis of sight and configured to display a plurality of graphic messages, said method comprising the following steps implemented when said head-mounted display is being worn by a user in a predetermined environment comprising a plurality of information interfaces:
   A1. determining a first datum relating to a position and orientation of a head of said user with respect to said environment based on information relating to a spatial arrangement of said environment;
   A2. receiving second data relating to operation of the interfaces;
   B. modifying a brightness of said head-mounted display and/or adjusting said graphic messages, depending on a dataset containing the first datum and the second data and containing information relating to said interfaces, said adjustment of the graphic messages comprises adjusting the content and/or number and/or position of the graphic messages and wherein the first datum comprises an indication regarding a coincidence of the field of view with said interfaces and regarding a superposition of the axis of sight with said interfaces, and wherein the adjustment of the number of graphic messages comprises displaying only at least one of said graphic messages rated beforehand as being critical, when the first datum indicates that the axis of sight is superposed on one of said interfaces rated beforehand as having priority in said information relating to said interfaces and when the second data indicate that said interface rated beforehand as having priority is turned on.

2. The method according to claim 1, wherein said adjustment of the number of graphic messages comprises deleting at least one of the graphic messages, which is referred to as the redundant message, when said indication and said information (II) relating to said interfaces indicate that the field of view of the head-mounted display is coincident with one of said interfaces delivering said redundant message or equivalent information.

3. The method according to claim 1, comprising, subsequent to step B, a step C in which the user modifies a position of the axis of sight (AV) in the field of view (FOV) in such a way as to modify said indication regarding a superposition of the axis of sight with said interfaces when steps A1 and B are subsequently implemented.

4. The method according to claim 1, wherein said adjustment of the graphic messages is made only when the first datum (D1) comprises the indication that the axis of sight (AV) is superposed with one of said interfaces, while being more than 0.6° to 6° from an edge of said interface, or when the first datum comprises the indication that the field of view coincides by more than 0.6° to 6° with one of said interfaces.

5. The method according to claim 1, comprising a step A3 implemented before step B consisting in receiving at least one physiological datum of the user, which is referred to as the third datum (D3), the third datum being contained in said dataset used in step B.

6. The method according to claim 1, wherein said environment is a cockpit of a vehicle.

7. The method according to claim 6, comprising a step A4 implemented before step B consisting in receiving at least one datum relating to a phase of use of the vehicle, which is referred to as the fourth datum (D4), the fourth datum being contained in said dataset used in step B.

8. The method according to claim 6, comprising a step A5 implemented before step B consisting in receiving at least one datum relating to an external environment of the vehicle, which is referred to as the fifth datum (D5), the fifth datum being contained in said dataset used in step B.

9. The method according to claim 6, wherein said adjustment of the graphic messages comprises adjusting the content and/or number and/or position of the graphic messages and wherein the first datum comprises an indication regarding a coincidence of the field of view with said interfaces and regarding a superposition of the axis of sight with said interfaces, and wherein the adjustment of the number of graphic messages consists in displaying a maximum number of graphic messages when the first datum indicates that said field of view is entirely superposed with a region of the cockpit displaying none of said graphic messages or equivalent information.

10. The method according to claim 1, wherein the steps of the method of the invention are repeated with a period of less than or equal to 100 ms, and preferably of less than 10 ms.

11. A computer program product, said computer program product comprising code instructions stored in a processor of a computer causing the processor to perform the steps of the method according to claim 1, when said computer program product is executed on the computer.

12. A head-mounted display (HMD) intended to be worn by a user, said head-mounted display having a predetermined field of view and a predetermined axis of sight and being configured to display a plurality of graphic messages, said head-mounted display comprising a processor (UT) configured to implement the steps of the method according to claim 1, when said head-mounted display is being worn in a predetermined environment comprising a plurality of information interfaces (IN1-IN6).

* * * * *